US006975742B2

(12) United States Patent
Cheng

(10) Patent No.: US 6,975,742 B2
(45) Date of Patent: Dec. 13, 2005

(54) RATE-DISTORTION OPTIMIZATION SYSTEM AND METHOD FOR IMAGE COMPRESSION

(75) Inventor: Hui Cheng, Webster, NY (US)

(73) Assignee: Xerox Corporation, Stamford, CT (US)

( * ) Notice: Subject to any disclaimer, the term of this patent is extended or adjusted under 35 U.S.C. 154(b) by 861 days.

(21) Appl. No.: 09/724,330

(22) Filed: Nov. 29, 2000

(65) Prior Publication Data

US 2002/0064313 A1 May 30, 2002

(51) Int. Cl.$^7$ .............................................. G06K 9/36
(52) U.S. Cl. ...................................... 382/43; 382/239
(58) Field of Search ............................... 382/176–180, 382/232, 236–253

(56) References Cited

U.S. PATENT DOCUMENTS

| 5,535,013 A | 7/1996 | Murata |
| 5,682,249 A | 10/1997 | Harrington et al. |
| 6,236,757 B1 * | 5/2001 | Zeng et al. .................. 382/240 |
| 6,553,072 B1 * | 4/2003 | Chiang et al. ......... 375/240.25 |

FOREIGN PATENT DOCUMENTS

WO   WO 97/15146 A1 *  4/1997   ............ H04N 7/26

OTHER PUBLICATIONS

Schuster et al. "An optimal segmentation encoding scheme in the rate-distortion sense" IEEE International Symposium on ISCAS 1996, "connected World", vol. 2, pp. 640-643, May 1996.*

H. Cheng and C.A. Bouman, "Document Compression Using Rate-Distortion Optimized Segmentation," *Journal of Electronic Imaging*, pp. 1-33, Jul. 1999.

H. Cheng and C.A. Bouman, "Multilayer Document Compression Algorithm," Proceedings of the International Conference on Image Processing, Kobe Japan, Oct. 25-28, 1999.

H. Cheng and C.A. Bouman, "word: Segmentation Which Optimizes the Rate-Distortion Function," IT Workshop on Detection, Estimation, Classification, and Imaging, Santa Fe, NM, Feb. 24-26, 1999.

K. Konstantinides and D. Tretter, "A Method for Variable Quantization in JPEG for Improved Text Quality in Compound Documents," *IEEE*, pp. 565-568, 1998.

H. Cheng and C. A. Bouman, "Trainable Context Model for Multiscale Segmentation," *IEEE*, pp. 610-614, 1998.

M. Effros and P.A. Chau, "Weighted Universal Bit Allocation: Optimal Multiple Quantization Matrix Coding,"*IEEE*, pp. 2343-2346, 1995.

(Continued)

*Primary Examiner*—Jingge Wu
(74) *Attorney, Agent, or Firm*—Fay, Sharpe, Fagan, Minnich & McKee, LLP

(57) ABSTRACT

A method of image compression includes digitizing an image and segmenting the image in a plurality of different manners to generate a plurality of segmented images. Each of the segmented images is compressed. The method further includes determining a bit rate for each of the compressed images, and determining how much image distortion results from each compression, Finally, the manner of segmentation which results in an optimal compromise between the rate and distortion is selected.

17 Claims, 3 Drawing Sheets

OTHER PUBLICATIONS

K. Ramchandran and M. Vetterli, "Rate-Distortion Optimal Fast Thresholding with Complete JPEG/MPEG Decoder Compatibility," *IEEE*, pp. 700-704, 1994.

C.A. Bouman and M. Shapiro, "A Multiscale Random Field Model for Bayesian Image Segmentation," *IEEE*, pp. 162-177, 1994.

A. Ortega and K. Ramchandran, "Rate-Distortion Methods for Image and Video Compression," *IEEE Signal Processing Magazine*, pp. 23-50, 1998.

A. Said and W. A. Pearlman, "A New, Fast, and Efficient Image Codec Based on Set partitioning in Hierarchical Trees," *IEEE*, pp. 243-250, 1996.

P. G. Howard, et al., "The Emerging JBIG2 Standard," *IEEE*, pp. 838-848, 1998.

M. T. Orchard and C. A. Bouman, "Color Quantization of Images," *IEEE*, pp. 2677-2690, 1991.

De Queiroz, et al., "Optimizing Block-Thresholding Segmentation for Multilayer Compresssion of Compound Images," IEEE Transactions on Image Processing, IEEE Inc. New York, US, vol. 9, No. 9, Sep. 2000, pp. 1461-1471.

Reusens, et al., "Dynamic Approach to Visual Data Compression, " IEEE Transactions on Circuits and Systems for Video Technology, IEEE Inc., New York, US, vol. 7, No. 1, Feb. 1, 1997, pp. 197-210.

* cited by examiner

RATE-DISTORTION OPTIMIZATION SYSTEM AND METHOD FOR IMAGE COMPRESSION

BACKGROUND OF THE INVENTION

The present invention relates to the art of image processing. It finds particular application in conjunction with digital image processing for file compression, and will be described with particular reference thereto. However, it is to be appreciated that the present invention is also amenable to other like applications.

In a modern office environment, it is common to have many documents digitally scanned, electronically created, stored, transmitted, printed and/or displayed. Typically, it is preferred that these operations be performed rapidly. Nevertheless, user expectations of quality are still often high. Digital implementation of a rapid high quality image path can be particularly formidable considering that a single page of a color document scanned at 600 spots per inch (spi) may be approximately 100 Megabytes in size. Consequently, practical systems for processing color or other sizable documents demand document compression methods that achieve high compression ratios with low distortion. "Document" images generally differ from "natural" images because they tend to contain well defined regions with distinct characteristics, such as text, graphics, continuous-tone pictures, halftone pictures and background. For example, typically, it is desired that text have a high spatial resolution for legibility, while high color resolution is often not required. Alternatively, continuous-tone pictures benefit from high color resolution, but can tolerate relatively lower spatial resolution. Therefore, it is desirable that a document compression algorithm be adaptive in order to meet different goals and exploit different types of redundancy among different image classes or types. Nevertheless, traditional compression algorithms, such as JPEG, are based on the assumption that an input image is spatially homogeneous, so they tend to perform poorly on document images.

A commonly used format in which images are represented for document or image compression is the known 3-layer model based foreground/mask/background representation for mixed raster content (MRC). Generally, the foreground layer contains the text and line graphics, and the background layer contains pictures and background. The mask is a binary image which determines, for each pixel in the digitized image, if the foreground pixel information or the background pixel information should be used. To apply the 3-layer MRC model, a document image is first segmented into foreground and background layers, and an appropriate mask is generated.

The subsequent performance of a document or image compression system or algorithm is directly related to the segmentation. With respect to document or image compression, an advantageous segmentation not only lowers the bit rate of the compressed image (i.e., the number of bits used to represent the compressed image per pixel in the uncompressed image), but also lowers the distortion in the reconstructed image. On the other hand, damaging artifacts are often caused by misclassifications in the segmentation. Generally, however, as the rate improves the distortion suffers, and as the distortion improves the rate suffers. This is known as the rate-distortion compromise. The optimal rate-distortion compromise is often a matter of individual preference or a function of particular constraints imposed by specific applications.

In any event, previously developed segmentation algorithms or systems, employing so called direct segmentation methods, typically compute or determine segmentation using only the input image or pixel data. They do not consider the properties of the subsequent compression technique applied, nor is the rate-distortion compromise desired by a user considered. That is to say, segmentation is not regulated by the ultimate outcome of the compression achieved. Rather, the input image or pixel data is classified for segmentation solely based upon a predetermined set of guidelines which determine classification from the data itself. For example, if based on the predetermined guidelines a region of a document is determined to contain text, then segmentation into foreground and background layers and generation of a mask layer for a 3-layer MRC model would be carried out accordingly regardless of the ultimate effect that segmentation may have on the subsequent compression.

Accordingly, the present invention contemplates a new and improved technique for document or image segmentation and compression which overcomes the above-referenced problems and others.

SUMMARY OF THE INVENTION

In accordance with one aspect of the present invention, a method of image compression is provided. The method includes digitizing an image and segmenting the image in a plurality of different classes to generate a digitized image according to a resulting segmentation obtained from rate and distortion measurements. The method further includes determining a bit rate for each of the compressed images, and determining how much image distortion results from each compression. Finally, the manner of segmentation which results in an optimal compromise between the rate and distortion is selected.

In accordance with a more limited aspect of the present invention, the segmenting is carried out using a 3-layer MRC model. However, any of the well known imaging model, known in the art, may be used.

In accordance with a more limited aspect of the present invention, the step of determining the distortion further includes reconstructing the compressed image and calculating the distortion from the reconstructed image and original digitized image.

In accordance with a more limited aspect of the present invention, the method further includes re-compressing the digitized image corresponding to the selected class of segmentation.

In accordance with a more limited aspect of the present invention, the method further includes outputting the compressed image corresponding to the selected manner of segmentation.

In accordance with a more limited aspect of the present invention, the optimal compromise between the rate and distortion is achieved when a weighted sum of the rate and distortion is at a minimum.

In accordance with a more limited aspect of the present invention, the weighting of the sum is set to favor one of the rate and distortion over the other.

In accordance with a more limited aspect of the present invention, the weighting of the sum is adjustable.

In accordance with another aspect of the present invention, an image compression system for compressing an input image includes a first processing bank. The first processing bank includes an array of first processors which each have a distinct coder that separately carries out coding to segment and compress the image. The first processors each output a bit rate, or an estimated bit rate, and image distortion measurement resulting from their respective codings. The system also includes an optimization engine which receives each pair of the rate and distortion measurements from the first processors. The optimization engine selects the first processor having an optimized compromise between the rate and distortion measurements.

In accordance with a more limited aspect of the present invention, the coders of the first processors compress the image using a 3-layer MRC model.

In accordance with a more limited aspect of the present invention, the optimization engine calculates the optimized compromise between the rate and distortion measurements using a cost function which is a weighted sum thereof. The optimization engine then selects the first processor whose associated cost function is lowest.

In accordance with a more limited aspect of the present invention, the weighting of the sum is adjustable.

In accordance with a more limited aspect of the present invention, each of the first processors further includes a decoder which reconstructs the image from the coder. The reconstructed image is used as a basis for the distortion measurement.

In accordance with a more limited aspect of the present invention, the system further includes a second processing bank having an array of coders. The original digitized image from the selected first processor is transmitted to a corresponding coder in the second processing bank for re-coding. The re-coding is the same as the coding carried out by the selected first processor.

In accordance with a more limited aspect of the present invention, the compressed image from the selected first processor is output by the system.

In accordance with a more limited aspect of the present invention, the image compression system is incorporated in a document processing network such that the compressed image is routed over the network to an output device in compressed form.

In accordance with a more limited aspect of the present invention, the output device is a printer, a digital copier, a xerographic copier, a fax machine, a monitor, or a storage device.

One advantage of the present invention is that it produces more robust segmentations.

Another advantage of the present invention is that misclassifications which can cause severe artifacts are substantially eliminated insomuch as all possible segmentation choices are tested for each block of the image and the corresponding distortion is measured.

Yet another advantage of the present invention is that a user can control the trade-off between the bit rate and the distortion.

Still further advantages and benefits of the present invention will become apparent to those of ordinary skill in the art upon reading and understanding the following detailed description of the preferred embodiments.

BRIEF DESCRIPTION OF THE DRAWINGS

The present invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
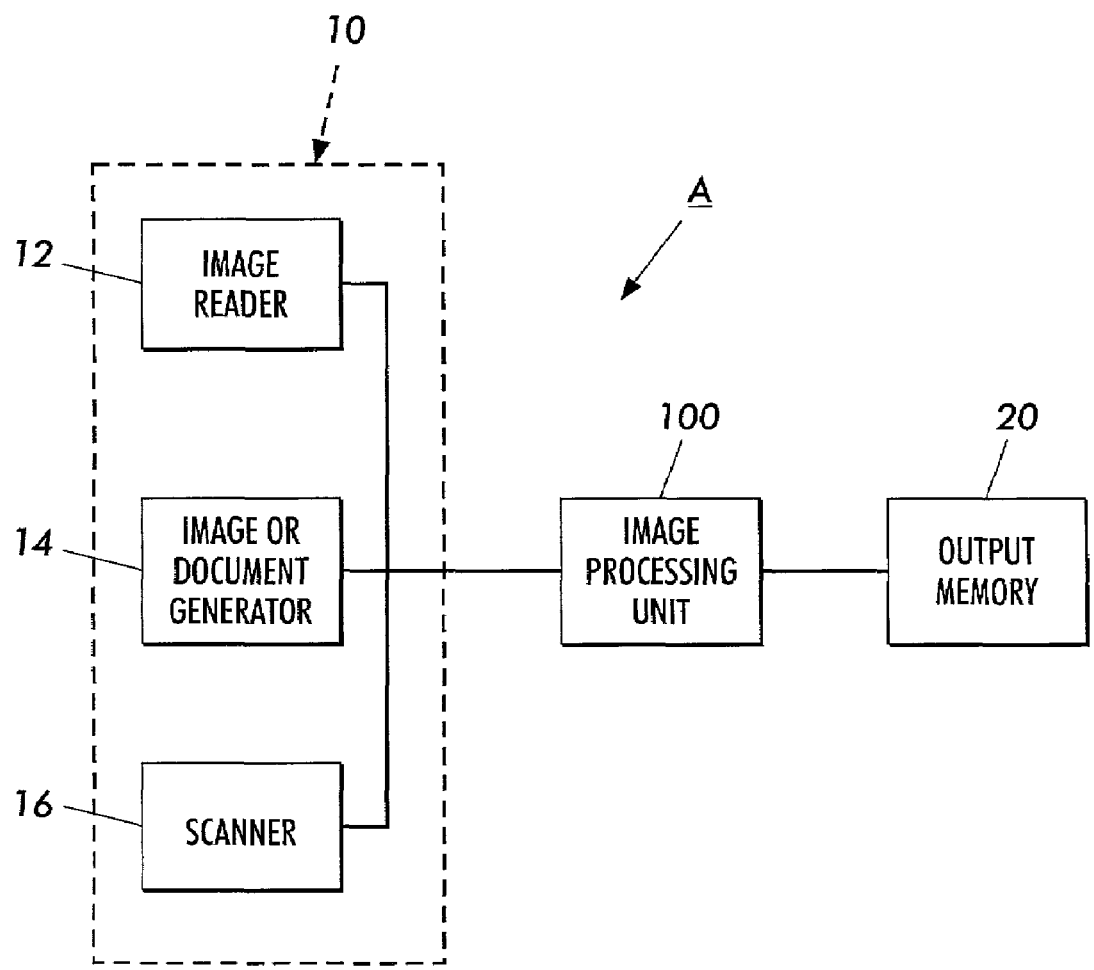
FIG. 1 is diagrammatic illustration of an image processing system for use in accordance with aspects of the present invention.

With reference to FIG. 1, a document or image processing system A employs an input terminal 10 to read or otherwise receive an input document or image, optionally, a full color document or image. The input terminal 10 optionally includes one or more suitable input devices such as an electronically or otherwise stored image reader 12, a computer image or document generator 14, a scanner 16, or the like which reads in or generates the input document or image as pixels or digital image data. Preferably, the digitized input document or image exists as a file on a computer network or a document management/processing network.

The image is sampled by an image processing unit 100 which carries out segmentation and compression. After compression is completed, the compressed image or document is output from the image processing unit 100. The compressed image is optionally electronically stored in memory 20 or an otherwise appropriated storage device. Alternately, the compressed image or document is stored optically or magnetically on a disk or tape. In any event, the compressed image or document is readily accessed and/or transported over the network in the usual manner. Of course, prior to rendering by an appropriate rendering engine, such as a printer, display monitor, xerographic or digital copier, fax machine, etc., the compressed imaged is first decompressed or otherwise reconstructed in the usual manner.

Figure 2:
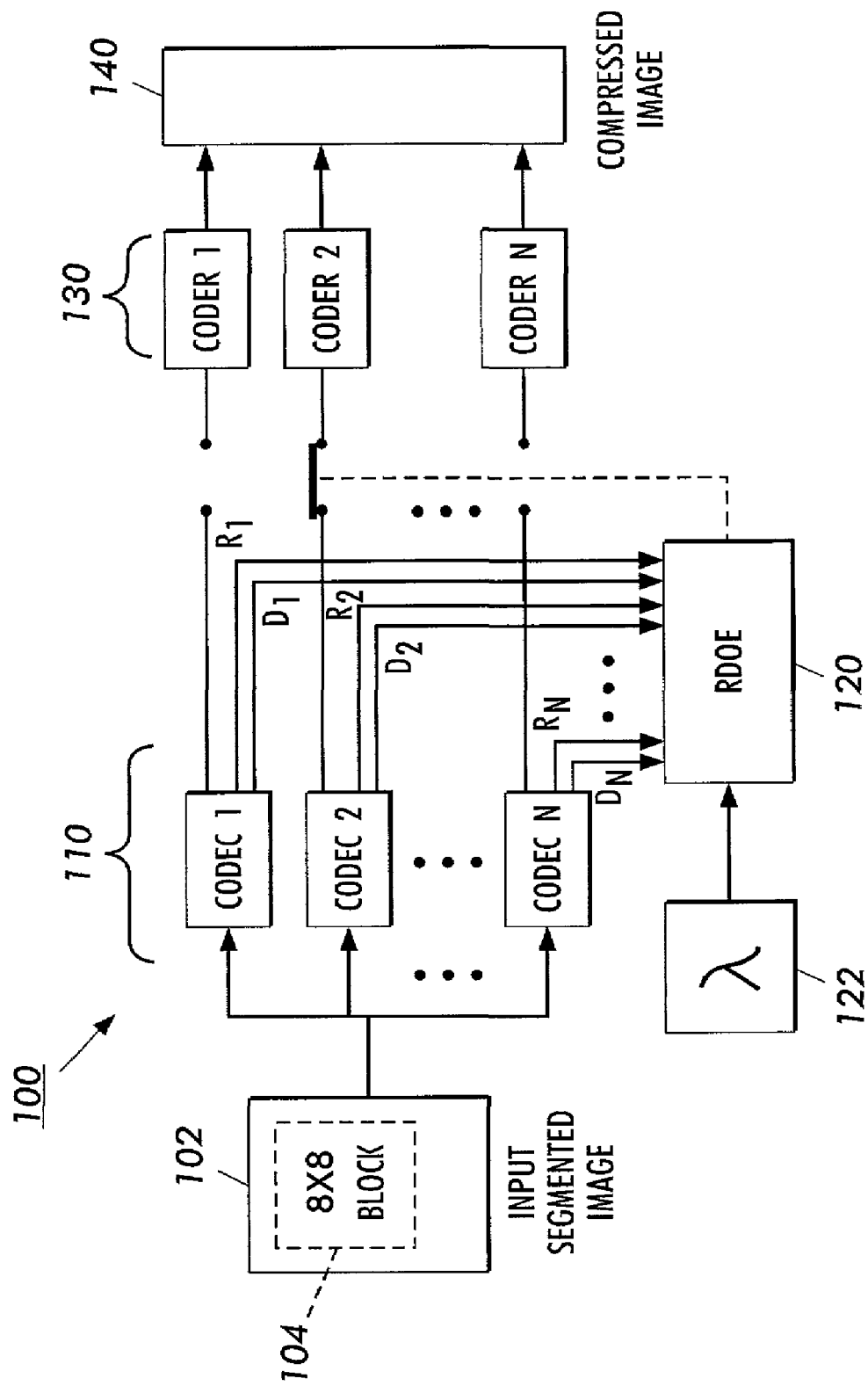
FIG. 2 is diagrammatic illustration of a first embodiment of an image processing unit in accordance with aspects of the present invention; and, FIG. 3 is diagrammatic illustration of another embodiment of an image processing unit in accordance with aspects of the present invention.

With reference to FIG. 2, an exemplary image processing unit 100 in accordance with aspects of the present invention is shown. From the input image 102, a sample 104 is taken. As shown, the sample 104 is an 8 by 8 block of pixels. Alternately, other sample sizes are employed as desired for particular applications. The sample 104 is processed by each of a plurality of coder-decoder pairs (CODECs) in an array or bank 110 of CODECS, namely, CODEC_1 through CODEC_N.

The coders in CODECs 1 through N each perform a distinct coding (i.e., partition blocks into different layers and compression) of the sample 104. In a preferred embodiment, the segmentation is carried out using a 3-layer MRC model. Collectively, the segmentations carried out by the coders in bank 110 represent all the possible segmentations available for the different classifications or types of blocks the sample 104 may represent. In this manner each possible segmentation is carried out on each sample regardless of the classification into which the sample 104 would otherwise fall.

That is, for example, in a 3-layer MRC model, there may be a plurality separate classifications into which the sample 104 falls. The sample 104 may represent a first type of block (i.e., it may be predominately text and/or line graphics), a second type of block (i.e., it may be predominately pictures and/or background) or a third type of block (i.e., a combination of first and second types of blocks). Ordinarily then, the sample 104 would be segmented in a first manner if it was the first type of block, in a second manner if it was the second type of block, and yet a third manner if it was the third type of block, wherein each of the first, second and third segmentations where different from one another.

In the 3-layer MRC model, the first type of block may be classified on a pixel-by-pixel basis using thresholding to put the pixels into one of two sets, with extracted colors from each set being used for all the pixels of the respective set. Optionally, the one with the higher luminance is the background color, and the other the foreground color. The mask layer is then generated to indicate which pixels belong in the respective background and foreground layers.

Conversely, the second type of block may be classified by putting the whole block into the background layer, setting the foreground layer to be a uniform block (e.g., with a mean color the same as a previous foreground block in raster order), and loading the mask layer with 0's to indicate that pixels of this block belong to the background layer.

As for the third type of block, it may be classified by putting the whole block into the foreground layer, setting the background layer to be a uniform block (e.g., with a mean color the same as a previous background block in raster order), and loading the mask layer with 1's to indicate that pixels of this block belong to the foreground layer.

In this manner, the foreground layer is made to contain the colors of text and line graphics, while the background layer is made to contain the colors of pictures and background. Accordingly, both layers have significant redundancy and can be compressed aggressively. The mask layer is made to contain the contours of text and other fine image structures, however, it has only two colors and can be compressed effectively using a binary image compression algorithm, such as, a token based compression algorithm. Optionally, other image segmentation protocols and/or algorithms as are known in the art may be employed.

In any event, with respect to the present invention, the coders of bank 110 are applied to all the segmentations on each sample 104 regardless of the classification or type of block the sample 104 is. For example, coder_1 optionally carries out a coding corresponding to a first type of block, coder_2 carries out a segmentation corresponding to a second type of block, and so on. However, regardless of the type of block the sample 104 may arguably represent, each sample 104 is processed by every coder in the bank 110.

In a preferred embodiment, the coders in each CODEC also carry out compression of the segmented image sample. Preferably, the coders employ any known compression techniques or algorithms, such as, e.g., JPEG, JBIG2 or the like. Alternately, different compression algorithms and/or techniques are used for different layers of the segmented image sample. In a preferred embodiment, the foreground and background layers of the 3-layer MRC model are compressed using JPEG, while the mask layer is compressed using JBIG2.

The decoder portions of each CODEC decompress and/or reconstruct the image from their corresponding coders. From each CODEC, the bit rate (R) of the compressed imaged and the distortion (D) of the reconstructed image are obtained, either via a direct measurement or an appropriately calculated estimation. Optionally, the bit rate is determined from a direct count or measure of the bits in the compressed image and a direct count or measure of the pixels in the uncompressed image. In a preferred embodiment, the distortion measurement is class-dependent. That is, the manner in which the distortion is measured varies depending on what the type or classification of block is for which the distortion is being determined. This is advantageous insomuch as different regions or block types of an output image can tolerate different types of distortion. For example, errors in high frequency bands can be substantially ignored in certain types of foreground and background blocks, but they can cause severe artifacts in other regions, e.g., in text. In any event, each CODEC outputs or otherwise makes accessible their corresponding set of R and D values, namely, R1 and D1 from CODEC_1; R2 and D2 from CODEC_2; through RN and DN from CODEC_N.

The R, D sets from the bank 110 of CODECs are transmitted to, accessed or otherwise received by a rate-distortion optimization engine (RDOE) 120. Using a cost function (CF), the RDOE 120 calculates or otherwise determines which CODEC (and hence which segmentation) achieved the best rate-distortion compromise. In a preferred embodiment, the cost function is a weighted sum of the bit rate and the distortion, and may be represented mathematically as:

$$CF = R + \lambda D \qquad (1);$$

where $\lambda$ is a non-negative real number or coefficient which represents the weighting factor controlling the trade-off between R and D. Alternately, of course, the weighting factor $\lambda$ is a coefficient of R rather than D. Nevertheless, as shown in equation (1), relatively higher values of $\lambda$ correspond to a relatively higher importance placed on the distortion, with respect to rate in the compromise. Alternatively, relatively lower values of $\lambda$ correspond to a relatively higher importance placed on the rate, with respect to distortion in the compromise. In the case where $\lambda$ is equal to 0, the lowest quality is achieved according to the rate measurement.

The RDOE 120 evaluates the cost function for each CODEC or R, D set 1 through N. The CODEC or R, D set corresponding to the minimum evaluated cost function is identified as the one having the optimum rate-distortion compromise.

Optionally, as shown in FIG. 2, $\lambda$ is obtained from a memory 122 or another like storage device. The memory 122 optionally stores one or more default values for $\lambda$. Alternately, $\lambda$ is stored optically or magnetically on a disk or tape. In a preferred embodiment, $\lambda$ is user defined or adjusted to achieve a desired relative weighting between the rate and the distortion. Accordingly, an appropriate input device (e.g., keyboard, mouse, and/or the like) is provided such that the desired $\lambda$ value may be entered either directly into the RDOE 120 or into the memory 122.

The RDOE 120 selects the identified CODEC from the bank 110 and connects it to a corresponding coder in a bank 130 containing coder_1 through coder_N. As shown, e.g., CODEC_2 has been identified as having to the optimal rate-distortion compromise and as such has been connected to its corresponding coder_2 in the coder bank 130. In this manner, the original digitized image is output or otherwise transmitted from the identified CODEC with the optimum rate-distortion compromise to the corresponding coder in bank 130 for re-coding. Preferably, the coders in bank 130 are identical to their counterparts in the corresponding CODECs. Accordingly, the output from the bank 130 of coders is a compressed document or image 140 having the identified optimal rate-distortion compromise.

Figure 3:
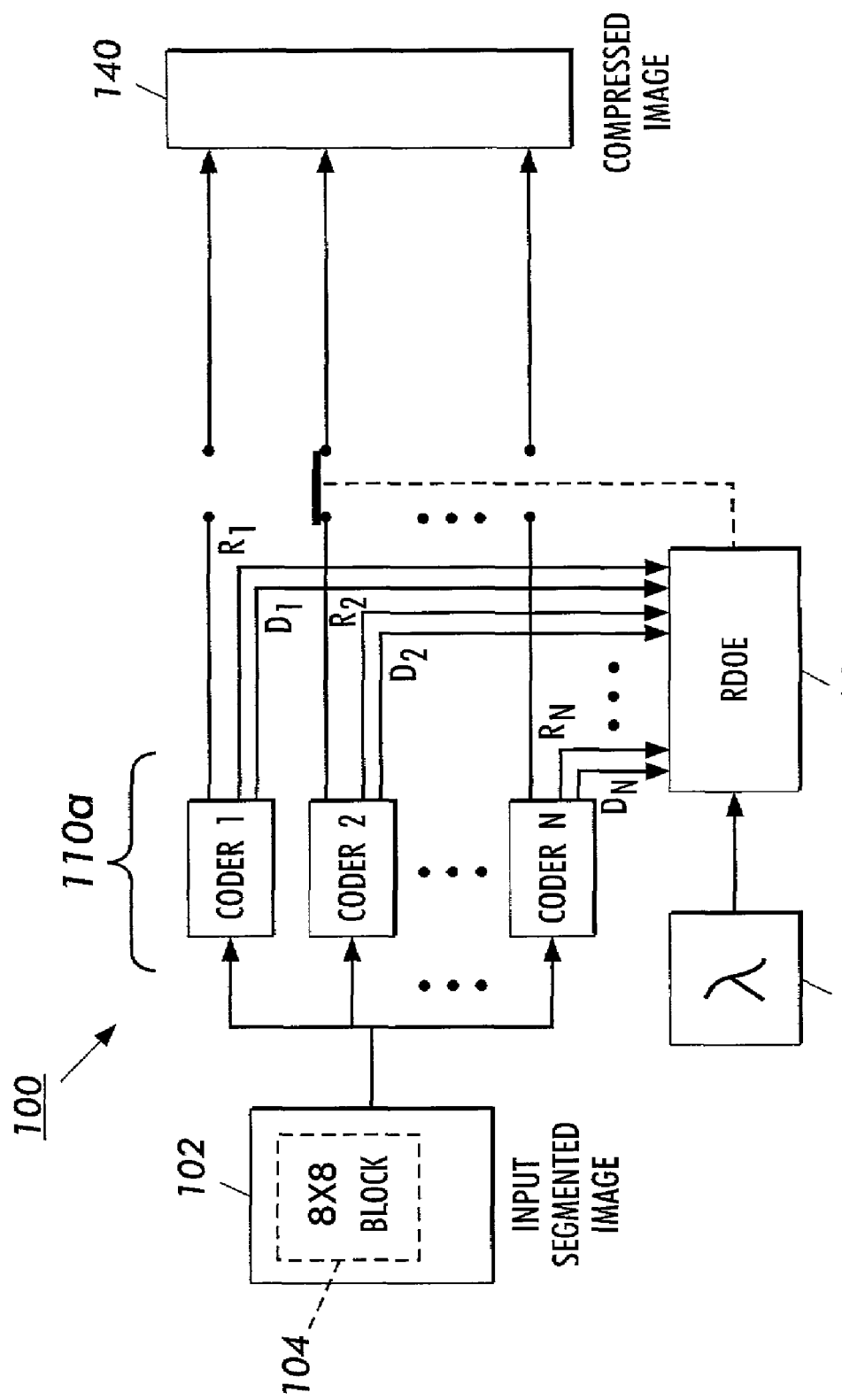

With further reference to FIG. 3, another exemplary image processing unit 100 in accordance with aspects of the present invention is shown, similar to that shown in FIG. 2. The most significant difference is that the bank 110a comprises an array of coders rather than the CODECs of bank 110. Accordingly, the output image from bank 110a is not decompressed and/or reconstructed due to the lack of a decoder. The identified coder in bank 110a having the optimal rate-distortion compromise may therefore be selected by the RDOE 120 such that its output gives the compressed image 140 directly without having to use the re-coding bank 130. However, in the embodiment of FIG. 3, both the rate and distortion have to be measured or estimated from the compressed image without the benefit of reconstruction.

In any event, an advantageous compression is achieved with an optimized rate-distortion compromise. That is to say, via feedback from the resulting compressed image and/or the reconstructed image, the segmentation of the input image is selected and/or regulated such that the best possible rate-distortion compromise is achieved. Unlike previously developed techniques, the segmentation applied is chosen without regard for the classification or block type of the input image. Rather, the segmentation chosen is based on the results achieved. Moreover, by employing an optional user defined, or selected weighting factor the rate-distortion compromise can be customized as desired for particular applications.

The invention has been described with reference to the preferred embodiments. Obviously, modifications and alterations will occur to others upon reading and understanding the preceeding detailed description. For example, preferably, the invention is implemented via a software configuration, a hardware configuration, or a combination of both. In any event, it is intended that the invention be construed as including all such modification and alterations insofar as they come within the scope of the appended claims or the equivalents thereof.

Having thus described the preferred embodiments, the invention is now claimed to be:

1. A method of image compression, said method comprising the steps of:
   (a) digitizing an image into a plurality of pixels;
   (b) sampling a block of pixels from the digitized image;
   (c) segmenting the block of pixels into a plurality of layers in accordance with a first segmentation algorithm to generate a first segmented sample;
   (d) segmenting the block of pixels into a plurality of layers in accordance with a second segmentation algorithm to generate a second segmented sample, said second segmentation algorithm being different than the first segmentation algorithm;
   (e) compressing the first and second segmented samples to generate first and second compressed image samples respectively;
   (f) determining a bit rate for the first and second compressed image samples;
   (g) determining how much image distortion results from each compression; and,
   (h) selecting the segmenting from steps (c) and (d) which resulted in an optimal compromise between the bit rate and distortion determined in steps (f) and (g).

2. The method according to claim 1, wherein the segmenting in steps (c) and (d) is carried out using a 3-layer MRC model.

3. The method according to claim 1, wherein step (g) further comprises:
   reconstructing the first and second compressed image samples; and,
   calculating the distortion from the reconstructed images.

4. The method according to claim 3, said method further comprising:
   (i) re-compressing the reconstructed image corresponding to the selected segmenting.

5. The method according to claim 1, said method further comprising:
   (i) outputting the compressed image corresponding to the selected segmenting.

6. The method according to claim 1, wherein the optimal compromise between the bit rate and distortion is achieved when a weighted sum of the bit rate and distortion is at a minimum.

7. The method according to claim 6, wherein the weighting of the sum is set to favor one of the bit rate and distortion over the other.

8. The method according to claim 6, wherein the weighting of the sum is adjustable.

9. An image compression system for compressing an input image, said system comprising:
   a first processing bank, said first processing bank including an array of first processors, wherein each first processor has a distinct coder which separately carries out coding to segment and compress the image, said first processors each outputting a bit rate and image distortion measurement resulting from their respective codings; and,
   an optimization engine which receives each pair of the rate and distortion measurements from the first processors, said optimization engine selecting the first processor having an optimized compromise between the rate and distortion measurements.

10. The image compression system according to claim 9, wherein the coders of the first processors segment the image using a 3-layer MRC model.

11. The image compression system according to claim 9, wherein the optimization engine calculates the optimized compromise between the rate and distortion measurements using a cost function which is a weighted sum thereof, said optimization engine selecting the first processor whose associated cost function is lowest.

12. The image compression system according to claim 11, wherein the weighting of the sum is adjustable.

13. The image compression system according to claim 9, wherein each of the first processors further includes a decoder which reconstructs the image from the coder, said reconstructed image being a basis for the distortion measurement.

14. The image compression system according to claim 13, said system further comprising:
   a second processing bank, said second processing bank including an array of coders, wherein the reconstructed image from the selected first processor is transmitted to a corresponding coder in the second processing bank for re-coding, said re-coding being the same as the coding carried out by the selected first processor.

15. The image compression system according to claim 9, wherein the compressed image from the selected first processor is output by the system.

16. The image compression system according to claim 15, wherein the image compression system is incorporated in a document processing network such that the compressed image is routed over the network to an output device in compressed form.

17. The image compression system according to claim 16, wherein the output device is selected from the group consisting of a printer, a digital copier, a xerographic copier, a fax machine, a monitor, and a storage device.

* * * * *